June 30, 1959  P. MATILE  2,892,870
PROCESS FOR PURIFYING AND CRYSTALLIZING UREA
Filed Nov. 19, 1956
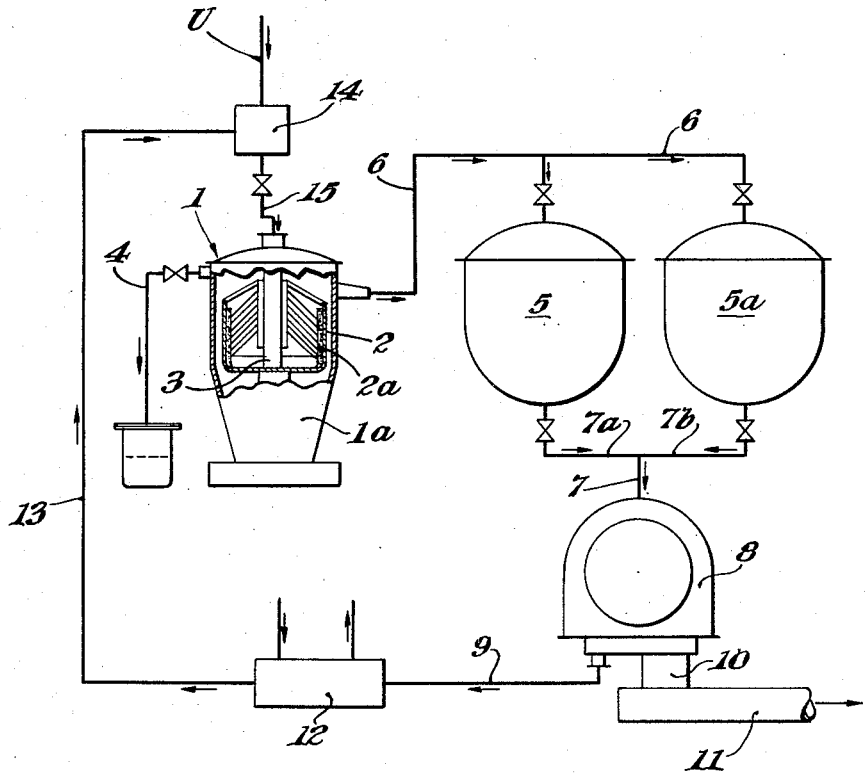
INVENTOR
*PASCAL MATILE*
BY
AGENT

United States Patent Office 2,892,870
Patented June 30, 1959

2,892,870

PROCESS FOR PURIFYING AND CRYSTALLIZING UREA

Pascal Matile, Visp, Switzerland, assignor to Lonza Electric and Chemical Works Ltd., Basel, Switzerland, a corporation of Switzerland Application November 19, 1956, Serial No. 622,730

Claims priority, application Switzerland November 21, 1955

5 Claims. (Cl. 260—555)

The present invention relates to the manufacture of urea in purified form. More particularly the invention relates to an improved method for purifying and crystallizing urea from aqueous solutions thereof.

It is well known that when ammonia and carbon dioxide, or compounds thereof such as ammonium carbonate, bicarbonate, carbamate and the like are subjected to high temperatures in a closed system, high pressures are generated and urea is formed. For example, urea synthesis has been conducted at pressures of from about 200–350 atmospheres in an autoclave maintained at temperatures of 160°–220° C. During the synthesis reaction the ammonia and carbon dioxide primarily combine exothermically to form ammonium carbamate which at the temperature of the reaction is slowly transformed into urea and water. The resulting reaction effluent mixture contains in addition to urea and water, uncombined residues of the starting materials and ammonium carbonate, bicarbonate and carbamate. The water formed during dehydration of the ammonium carbamate is condensed owing to the prevailing pressure and thereby forms an absorbent for the urea.

It has been the usual procedure that the aqueous autoclave effluent is next treated whereby unreacted ammonia and carbon dioxide are recovered and the water is vaporized and removed so as to obtain a relatively pure solid urea product. Such procedures of complete evaporation have in the past been economically unsatisfactory because the resultant hard crystalline mass has to be crushed into solids of useable shape and size. Further, the evaporation of water from a degassed urea solution to obtain a highly concentrate solid form of urea or urea melt has had the result that the impurities of the solution remain in the product form of urea. Such impurities are generally introduced into the urea synthesis and synthesis solution processing systems in two ways. The reactant feed gases (ammonia and carbon dioxide) form a first source of impurities since these gases are never in a 100% pure state. The second major source of impurities is the synthesis and synthesis melt treating plant itself. The pressure vessels, piping, pumps, compressors and valves provide a constant source of contaminates including oil, grease, metals and metal salts.

Attempts have been made to carry crystallization only to the point of producing a flowing crystalline slurry, thereafter separating the crystals from the contaminated mother liquor and recycling the mother liquor to the new solution for continuous partial crystallization. Such a process has a continual build-up of impurities in the recycled mother liquor and after a short period the overcontaminated mother liquor must be discarded. Attempts to clean the recycled mother liquor, as with filters located between the separating and crystallizing apparatus, have been unsuccessful since many of the impurities are in liquid form, rather than solids, and are not taken out by filters. Likewise solid impurities may be of such minute character that they too pass through the filters. Where a urea product of poor quality can be manufactured as a second product, the mother liquor, enriched with impurities, can be utilized by separate processing such as crystallization.

It is an object of the present invention to provide a new and improved method for treating synthetic urea solutions whereby the content of undesired contaminates in the product is materially reduced.

It is a further object of the invention to provide an economical method for removing reactant and plant impurities from a urea synthesis solution which may thereafter be utilized as a substantially pure liquid urea product or may be processed to obtain a substantially pure solid form of urea.

A still further object of this invention is to provide a urea solution purification process wherein a substantially contaminate-free urea liquor may be utilized directly or may be crystallized with a contaminate-free mother liquor recycle whereby the mother liquor may be continually reused while always obtaining a pure crystalline product.

Other objects and advantages of the invention will be apparent from the following description.

According to the present invention, the above objects are realized by the discovery that by separating the urea synthesis solution while in a relatively hot and crystal-free state, substantially all of the impurities therein are easily removed without loss of urea whereafter the contaminate-free urea liquor may be crystallized with continuous contaminate-free mother liquor recycle or may be cooled and used directly or be granulated or prilled. In any case, the product, either in solid or liquid form is contaminate-free and there is no build-up of contaminates within the system. Surprisingly the impurities in the urea solution have quite different physical properties from those of the synthetic urea solution whereby those with lower specific gravity than the urea solution flow away from the separated solution whereas those with a higher specific gravity are collected as a cake in the separator. By feeding the urea solution to the separator in a relatively hot condition there is no crystallization of the solution therein.

The invention is further described by reference to the accompanying drawing which illustrates a preferred embodiment of apparatus for accomplishing the purposes of the invention.

Referring to the drawing, a degassed urea solution U, including impurities, is fed into a liquid-liquid-solid separator 1. This separator may be a centrifuge and as shown is comprised primarily of a housing 1a and a rotary basket 2 supported for rotation on a centrally located cylinder 3 which also may include screw or other means for removing low specific gravity contaminates. During operation impurities with a lower specific gravity than the urea solution collect at the center of the separator and are drawn off whereas the impurities of higher specific gravity than the urea solution are separated from the solution and collect as a cake 2a in the basket 2. The low specific gravity impurities, such as oil or grease, are removed from the separator through line 4. The purified solution, which has remained free of urea crystals, leaving the separator may pass to crystallizers 5 and/or 5a through line 6 or may be treated in other known manner to form a urea solution of desired water content. Where the solution is to be crystallized (as shown) it is fed alternately into the crystallizers wherein it is evaporated during constant mixing so as to produce a slurry of mother liquor and crystals. This slurry is then alternately fed through lines 7a or 7b and line 7 to centrifuge 8 wherein the mother liquor and crystals are separated and leave through lines 9 and 10, respectively. The crystalline urea product in line 10 may be carried by conveyor 11 to a dryer (not shown) while the mother liquor in pipe 9 is heated to a suitable temperature in heat exchanger 12, thereafter being recycled in line 13 to a mixer 14 wherein recycled mother liquor and fresh degassed urea solution U are combined for introduction through line 15 into separator 1.

The recycle of mother liquor which is mixed with fresh urea solution prior to separation provides several distinct advantages. The recycled mother liquor is normally less concentrated and therefore may be at a low temperature with respect to the fresh urea and is less subject to biuret formation. By mixing recycle and fresh urea the higher temperature of the fresh solution is immediately reduced with a consequent assurance of less biuret formation. Also the provision of mixed fresh and recycle urea solutions provide a combined solution of lower viscosity from which impurities are more easily separated. Further, there are no crystals formed in the system prior to crystallization to obtain solid urea product so that there can be no plugging of apparatus or loss of urea during separation. Still further, the provision of recycling of mother liquor to a point prior to separation of the fresh urea solution assures that all of the separated and only separated urea (purified) is passed to the crystallizers.

While the manner of application of the invention may be varied widely, particularly with regard to the disposition of the purified urea solution to form a solid or liquid urea product, the following example describes an operation of the process in apparatus designed substantially as described and embodied in an actual urea crystallization plant. In the example parts are by weight.

*Example*

An aqueous solution of 80 parts urea and 20 parts water (80% urea) at 100° C. (crystallization temperature of 80° C.) containing synthesis impurities was mixed with a recycle mother liquor comprising 130 parts urea and 70 parts water (65% urea) having a temperature of 50° C. The mixed solution (210 parts urea and 90 parts water) (70% urea) was introduced to a centrifuge type separator wherein substantially all liquid and solid impurities of the solution were removed. The resulting pure solution (crystallization temperature of 58° C.) was partially crystallized in an evaporative-type crystallizer whereby the slurry leaving the crystallizer comprised of 80 parts urea crystals, 130 parts urea liquor and 70 parts water. The slurry of mother liquor and crystalline urea was then separated with the mother liquor being returned to the system as recycle urea solution. During continuous operation of the process there was no measureable build-up of impurities in the recycle mother liquor and the crystals showed a maximum turbidity of 20 p.p.m. based upon a standard A.P.H.A. test.

The advantages of impurity separation from a combined fresh urea and urea mother liquor solution at a temperature above the crystallization temperature prior to any crystallization in the process of this invention as well as recycling of a pure mother liquor as described above will be apparent from the above example.

It will be appreciated that various modifications may be made in the invention described above without deviating from the scope thereof as defined in the appended claims.

I claim:

1. In a process for purifying an aqueous urea solution containing turbidity producing suspended impurities of higher and lower relative specific gravity and crystallizing the purified solution: the improvement which comprises mixing said impure aqueous urea solution with a substantially pure urea solution; gravitationally separating said suspended impurities from said mixed solution, said mixed solution being maintained in a crystal-free state during said separation; partially crystallizing said purified mixed solution thereby forming a slurry of mother liquor and urea crystals; separating said crystals from said mother liquor and passing said mother liquor without further crystallization to said impure aqueous urea solution for admixture therewith as said substantially pure urea solution.

2. In a process for purifying an aqueous urea solution containing turbidity producing suspended impurities of higher and lower relative specific gravity and crystallizing the purified solution: the improvement which comprises mixing said impure aqueous urea solution with a substantially pure urea solution; centrifugally separating said suspended impurities from said mixed solution, said mixed solution being maintained in a crystal-free state during said separation; partially crystallizing said purified mixed solution thereby forming a slurry of mother liquor and urea crystals; separating said crystals from said mother liquor and passing said mother liquor without further crystallization to said impure aqueous urea solution for admixture therewith as said substantially pure urea solution.

3. In a process for purifying an aqueous urea solution containing turbidity producing suspended impurities of higher and lower relative specific gravity and crystallizing the purified solution: the improvement which comprises mixing said impure aqueous urea solution with a substantially pure urea solution; centrifugally separating said suspended impurities from said mixed solution, said mixed solution being maintained in a crystal-free state and at a temperature just above its crystallization temperature during said separation; partially crystallizing said purified mixed solution thereby forming a slurry of mother liquor and urea crystals; separating said crystals from said mother liquor and passing said mother liquor without further crystallization to said impure aqueous urea solution for admixture therewith as said substantially pure urea solution.

4. A process as claimed in claim 3 wherein the ratio of fresh impure aqueous urea solution to admixed mother liquor is from about 5:1 to 1:5.

5. In a process for purifying an aqueous urea solution containing turbidity producing suspended impurities of higher and lower relative specific gravity and crystallizing the purified solution: the improvement which comprises mixing said impure aqueous solution with a substantially pure urea solution having a lower concentration of urea than said impure solution; subjecting said mixed solution without crystallization and at a temperature just above its crystallization temperature to gravitational separation whereby said impurities are removed from said mixed solution; partially crystallizing said purified mixed solution thereby forming a slurry of substantially pure mother liquor and substantially pure urea crystals; separating said crystals from said mother liquor as solid urea product and passing said mother liquor without further crystallization and at a temperature just above its crystallization temperature to said impure aqueous urea solution for admixture therewith as said substantially pure urea solution.

References Cited in the file of this patent

UNITED STATES PATENTS

| | | |
|---|---|---|
| 1,232,104 | Sharples | July 3, 1917 |
| 2,663,731 | Michelitsch | Dec. 22, 1953 |